(12) United States Patent
Colson et al.

(10) Patent No.: US 8,734,017 B1
(45) Date of Patent: May 27, 2014

(54) AIR BEARING SHAFT

(71) Applicant: Hamilton Sundstrand Corporation, Windsor Locks, CT (US)

(72) Inventors: Darryl A. Colson, West Suffield, CT (US); Craig M. Beers, Wethersfield, CT (US); John H. Paliulis, South Windsor, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days.

(21) Appl. No.: 13/789,917

(22) Filed: Mar. 8, 2013

(51) Int. Cl.
*F16C 32/06* (2006.01)
*F01D 3/00* (2006.01)
*F01D 25/00* (2006.01)

(52) U.S. Cl.
USPC .......................... 384/107; 415/104; 415/229

(58) Field of Classification Search
USPC ........... 384/107; 415/104, 105, 109, 111, 229
See application file for complete search history.

(56) References Cited

U.S. PATENT DOCUMENTS

| 4,896,975 | A | 1/1990 | Bescoby et al. |
| 6,212,935 | B1 | 4/2001 | Shiozaki et al. |
| 6,249,366 | B1 | 6/2001 | Hinton et al. |
| 6,328,475 | B1 | 12/2001 | Jager |
| 6,450,781 | B1 | 9/2002 | Petrovich et al. |
| 6,455,964 | B1 | 9/2002 | Nims |
| 6,664,686 | B2 | 12/2003 | Ichiyama |
| 7,342,332 | B2 | 3/2008 | McAuliffe et al. |
| 7,394,175 | B2 | 7/2008 | McAuliffe et al. |
| 7,402,020 | B2 * | 7/2008 | Beers et al. ........................ 415/1 |
| 7,648,279 | B2 | 1/2010 | Struziak et al. |
| 7,648,280 | B2 | 1/2010 | Struziak et al. |
| 2011/0192165 | A1 | 8/2011 | Rosen et al. |
| 2012/0064814 | A1 | 3/2012 | Beers et al. |
| 2012/0064815 | A1 * | 3/2012 | Beers et al. ..................... 454/71 |
| 2012/0152383 | A1 | 6/2012 | Lugo et al. |
| 2012/0163742 | A1 * | 6/2012 | Underbakke et al. ......... 384/123 |

* cited by examiner

*Primary Examiner* — Thomas R Hannon
(74) *Attorney, Agent, or Firm* — Cantor Colburn LLP

(57) ABSTRACT

An air bearing shaft for an air cycle machine is provided. The air bearing shaft includes a seal disk and a shaft body. The shaft body includes a first shaft body portion extending from a face of the seal disk to a knife-edge seal. The first shaft body portion includes journal bearing cooling holes positioned axially closer to the knife-edge seal than to the face of the seal disk. The journal bearing cooling holes extend through the first shaft body portion to a hollow interior and have a total cooling area. Start-up holes are positioned axially closer to the face of the seal disk than to the knife-edge seal. The start-up holes extend through the first shaft body portion to the hollow interior. The start-up holes have a total start-up area. A ratio of the total cooling area to the total start-up area is between 2.17 and 4.06.

20 Claims, 4 Drawing Sheets

AIR BEARING SHAFT

BACKGROUND OF THE INVENTION

Exemplary embodiments of the invention generally relate to aircraft environmental control systems and, more particularly, to an air bearing shaft of an air cycle machine utilized as part of an aircraft environmental control system.

Conventional aircraft environmental control systems (ECS) incorporate an air cycle machine (ACM), also referred to as an air cycle cooling machine, for cooling and dehumidifying air supplied to an aircraft cabin. An ACM may include a centrifugal compressor and a centrifugal turbine mounted for co-rotation on a shaft. Air bearings in the form of journal bearings and thrust bearings are typically used to support rotation of the shaft. The centrifugal compressor further compresses partially compressed air, such as bleed air received from a compressor of a gas turbine engine. The compressed air discharges to a downstream heat exchanger or other system before returning to the centrifugal turbine. The compressed air expands in the turbine to thereby drive the compressor. The air output from the turbine may be utilized as an air supply for a vehicle, such as the cabin of an aircraft.

BRIEF DESCRIPTION OF THE INVENTION

According to one embodiment of the invention, an air bearing shaft for an air cycle machine is provided. The air bearing shaft includes a seal disk and a shaft body. The shaft body includes a first shaft body portion extending from a face of the seal disk to a knife-edge seal. The first shaft body portion includes a plurality of journal bearing cooling holes positioned axially closer to the knife-edge seal than to the face of the seal disk. The journal bearing cooling holes extend through the first shaft body portion to a hollow interior. The journal bearing cooling holes have a total cooling area. Start-up holes are positioned axially closer to the face of the seal disk than to the knife-edge seal. The start-up holes extend through the first shaft body portion to the hollow interior. The start-up holes have a total start-up area. A ratio of the total cooling area to the total start-up area is between 2.17 and 4.06.

According to another embodiment of the invention, an air cycle machine assembly is provided. The air cycle machine assembly includes a journal bearing and an air bearing shaft. The air bearing shaft includes a seal disk and a shaft body. The shaft body includes a first shaft body portion positioned within the journal bearing. The first shaft body portion extends from a face of the seal disk to a knife-edge seal. The first shaft body portion includes a plurality of journal bearing cooling holes positioned axially closer to the knife-edge seal than to the face of the seal disk. The journal bearing cooling holes extend through the first shaft body portion to a hollow interior. The journal bearing cooling holes have a total cooling area. Start-up holes are positioned axially closer to the face of the seal disk than to the knife-edge seal. The start-up holes extend through the first shaft body portion to the hollow interior. The start-up holes have a total start-up area. A ratio of the total cooling area to the total start-up area is between 2.17 and 4.06.

A method of installing an air bearing shaft in an air cycle machine assembly includes inserting the air bearing shaft into a journal bearing. The air bearing shaft includes a seal disk and a shaft body. The shaft body includes a first shaft body portion positioned within the journal bearing. The first shaft body portion extends from a face of the seal disk to a knife-edge seal. The first shaft body portion includes a plurality of journal bearing cooling holes positioned axially closer to the knife-edge seal than to the face of the seal disk. The journal bearing cooling holes extend through the first shaft body portion to a hollow interior, and the journal bearing cooling holes have a total cooling area. Start-up holes are positioned axially closer to the face of the seal disk than to the knife-edge seal. The start-up holes extend through the first shaft body portion to the hollow interior. The start-up holes have a total start-up area. A ratio of the total cooling area to the total start-up area is between 2.17 and 4.06. The method also includes coupling the air bearing shaft to a thrust shaft of the air cycle machine assembly, and coupling the air bearing shaft to a turbine rotor of the air cycle machine assembly.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
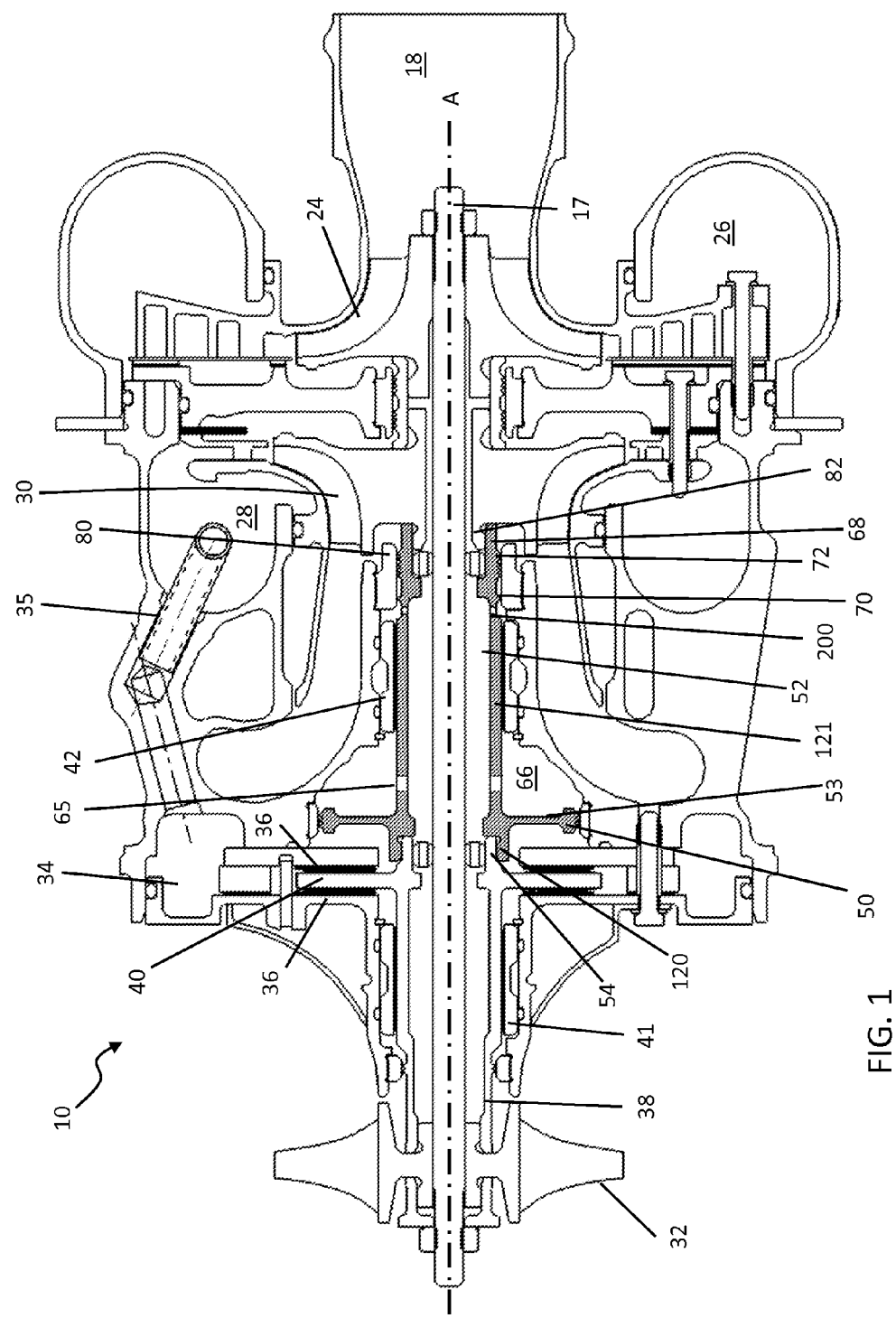
FIG. 1 is a cross-section of an air cycle machine (ACM) according to an embodiment.

Referring now to FIG. 1, an exemplary air cycle machine (ACM) 10 includes a compressor inlet 18 configured to deliver air to a compressor rotor 24. The compressor rotor 24 compresses the air and delivers it toward a compressor outlet 26. The compressor outlet 26 may pass compressed air to an aircraft air supply system (not depicted). In addition, a portion of the compressed air passes from the compressor outlet 26 to a turbine inlet 28, and drives a turbine rotor 30 to rotate about an axis A. Cooled air that is expanded by the turbine rotor 30 is also used as part of an aircraft air supply system (not depicted).

As illustrated, a tie rod 17 connects the compressor rotor 24 and the turbine rotor 30. The tie rod 17 also connects to a fan rotor 32 such that the compressor rotor 24, the turbine rotor 30, and the fan rotor 32 are all configured to rotate about the axis A.

A cooling air inlet 35 taps air from the turbine inlet 28, and delivers it into a chamber 34. Air from the chamber 34 passes between thrust bearing surfaces 36 and a thrust disk 40. The thrust disk 40 is part of a thrust shaft 38. The thrust shaft 38 has a forward extending portion 54 on one side of the thrust disk 40, which is received within a surface 120 in an air bearing shaft 121. Air that passes along the thrust bearing surfaces 36 is passed to a journal bearing 41 and a journal bearing 42, which are air bearings. A portion of the thrust shaft 38 is positioned within the journal bearing 41, and a portion of the air bearing shaft 121 is positioned within the journal bearing 42. Air passing along the journal bearing 42 reaches a plurality of journal bearing cooling holes 200 and can pass into a hollow interior 52 of the air bearing shaft 121. The air bearing shaft 121 also includes a seal disk 50 proximate the surface 120. A plurality of start-up holes 65 are axially positioned on the air bearing shaft 121 to align with a cavity 66 formed between the journal bearing 42 and a face 53 of the seal disk 50.

The size of the start-up holes 65 and the journal bearing cooling holes 200 helps to control relative volumes of air passing through the holes for various pressure ranges and operational conditions. In an embodiment, the start-up holes 65 reduce the pressure required to start the ACM 10. The journal bearing cooling holes 200 ensure sufficient cooling flow to the journal bearing 42 and also lower start pressure requirements.

Between an air bearing shaft end 68 and the journal bearing cooling holes 200, the air bearing shaft 121 further includes a knife-edge seal 70 and a group of knife-edge seals 72 that are positioned proximate to a seal land 80. The air bearing shaft end 68 is coupled to a turbine rotor end 82 of the turbine rotor 30.

The ACM 10 also includes a number of other components that are known in the art. Any combination of two or more components of the ACM 10 may be referred to generally herein as an ACM assembly.

Figure 2:
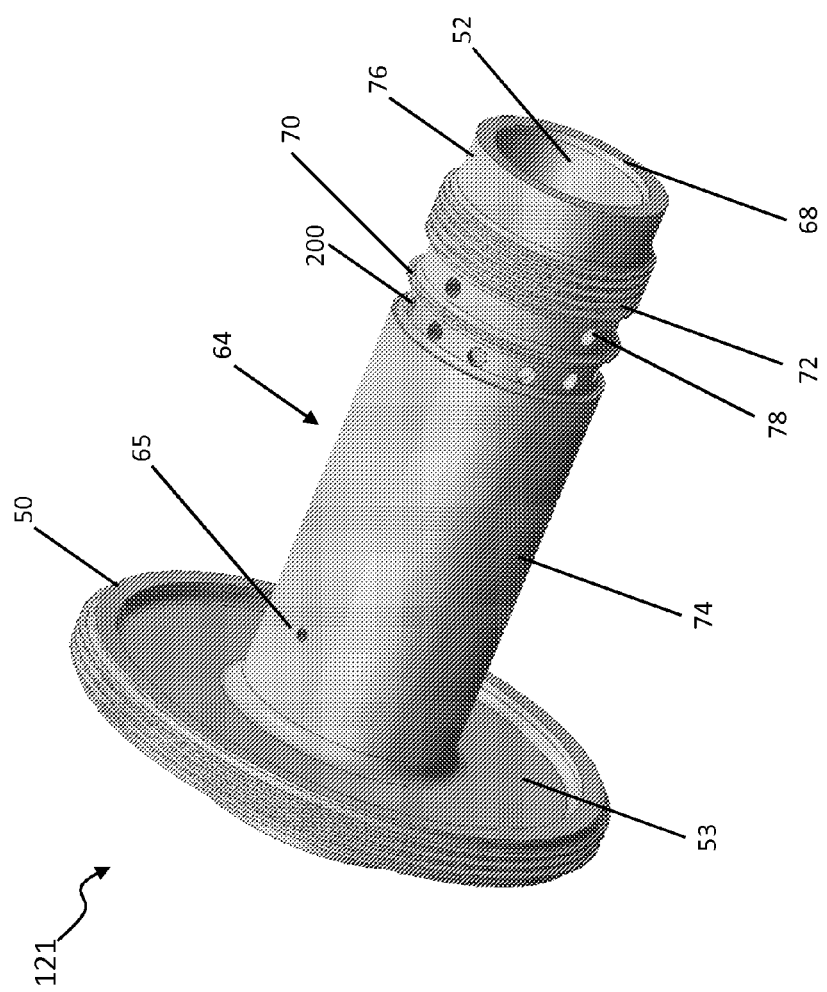
FIG. 2 is a perspective view of an air bearing shaft of the ACM of FIG. 1 according to an embodiment.

FIG. 2 is a perspective view of the air bearing shaft 121 of the ACM 10 of FIG. 1 according to an embodiment. A shaft body 64 of the air bearing shaft 121 includes a first shaft body portion 74 extending from the face 53 of the seal disk 50 to the knife-edge seal 70. The first shaft body portion 74 includes the journal bearing cooling holes 200 positioned axially closer to the knife-edge seal 70 than to the face 53 of the seal disk 50. The journal bearing cooling holes 200 extend through the first shaft body portion 74 to the hollow interior 52 of the air bearing shaft 121. The first shaft body portion 74 also includes the start-up holes 65 positioned axially closer to the face 53 of the seal disk 50 than to the knife-edge seal 70. The start-up holes 65 extend through the first shaft body portion 74 to the hollow interior 52 of the air bearing shaft 121.

The shaft body 64 also includes a second shaft body portion 76. The second shaft body portion 76 is proximate the knife-edge seal 70 of the first shaft body portion 74 and extends to the air bearing shaft end 68. The second shaft body portion 76 includes a plurality of seal vent holes 78 positioned between the knife-edge seal 70 and the group of knife-edge seals 72. The seal vent holes 78 provide an inter-stage vent for better seal performance.

Figure 3:
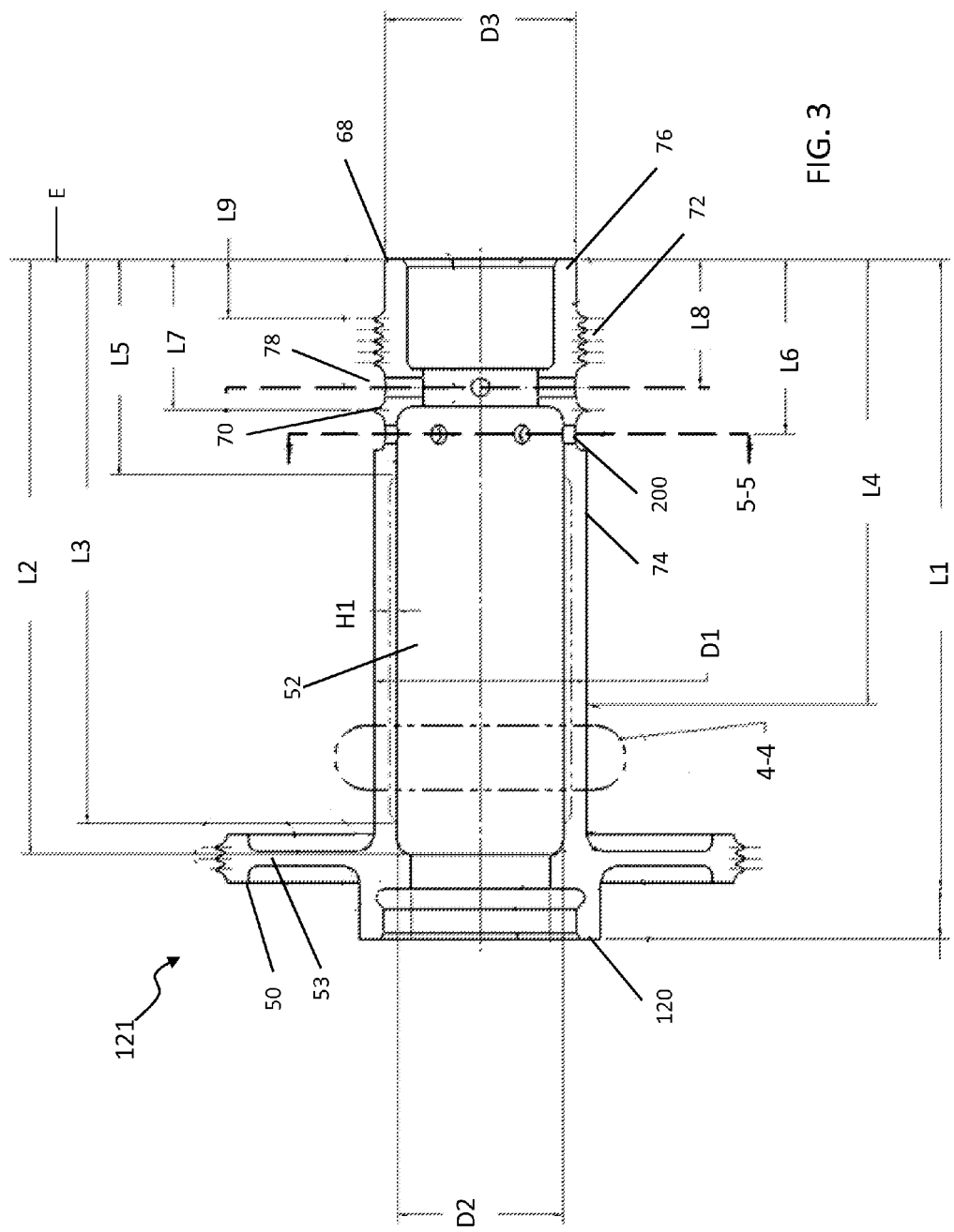
FIG. 3 is a cross-section of the air bearing shaft of FIG. 2 according to an embodiment.

FIG. 3 is a cross-section of the air bearing shaft 121 of FIG. 2 according to an embodiment. In an embodiment, the first shaft body portion 74 has an outer diameter D1 of about 0.9 inches (2.286 cm) and an inner diameter D2 of about 0.705 inches (1.791 cm). The first shaft body portion 74 may also include an additional hollow portion H1 that extends the inner diameter D2 by about 0.03 inches (0.0762 cm). The second shaft body portion 76 has an outer diameter D3 of about 0.81 inches (2.057 cm).

A number of feature lengths are defined relative to an end plane E of the air bearing shaft end 68. In an embodiment, the air bearing shaft 121 has a length L1 of about 2.895 inches (7.353 cm). The face 53 of the seal disk 50 has a length L2 of about 2.535 inches (6.439 cm) relative to the end plane E. In an embodiment, transitions for the additional hollow portion H1 are offset by lengths L3 and L5 relative to the end plane E, where L3 is about 2.405 inches (6.109 cm) and L5 is about 0.92 inches (2.337 cm). Axially placement of the start-up holes 65 on the first shaft body portion 74 is bounded by the length L2 and length L4 relative to the end plane E, where length L4 is about 1.84 inches (4.674 cm). The journal bearing cooling holes 200 are positioned at a length L6 of about 0.745 inches (1.892 cm) relative to the end plane E. The knife-edge 70 is positioned at a length L7 of about 0.645 inches (1.638 cm) from the end plane E. The seal vent holes 78 are positioned at a length L8 of about 0.545 inches (1.384 cm) from the end plane E. The group of knife-edge seals 72 is offset by a length L9 of about 0.255 inches (0.648 cm) from the end plane E.

Figure 4:
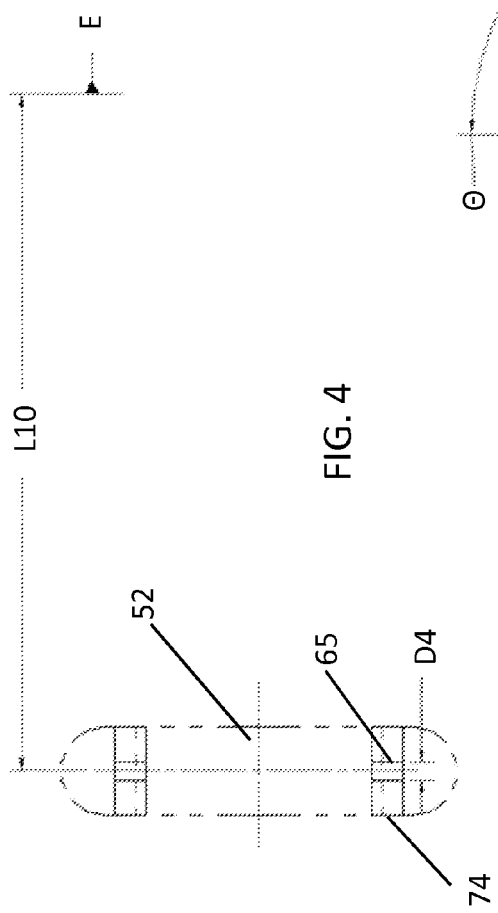
FIG. 4 is a cross-section of a plurality of start-up holes of the air bearing shaft of FIG. 2 according to an embodiment.

FIG. 4 is a cross-section of a plurality of start-up holes 65 of the air bearing shaft 121 of FIG. 2 according to an embodiment. In an embodiment, the start-up holes 65 are offset by a length L10 of about 2.12 inches (5.385 cm) from the end plane E. However, as previously described, the start-up holes 65 can be shifted along the first shaft body portion 74 such that the start-up holes 65 are axially positioned to align with the cavity 66 of FIG. 1 formed between the journal bearing 42 of FIG. 1 and the face 53 of the seal disk 50. In an embodiment, there are two start-up holes 65, which are substantially equally distributed by about 180 degrees at a substantially axially aligned position. Each of the start-up holes 65 has a diameter D4 of about 0.055 inches (0.140 cm). Accordingly, a total start-up area is about 0.00478 inches$^2$ (0.0308 cm$^2$).

Figure 5:
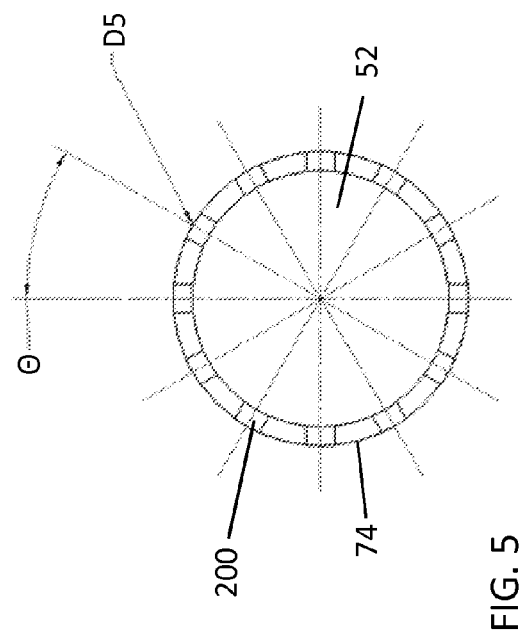
FIG. 5 is a cross-section of a plurality of journal bearing cooling holes of the air bearing shaft of FIG. 2 according to an embodiment.

FIG. 5 is a cross-section of a plurality of journal bearing cooling holes 200 of the air bearing shaft 121 of FIG. 2 according to an embodiment. In an embodiment, there are twelve start-up holes 200, which are substantially equally distributed at an angle θ of about 30 degrees at a substantially axially aligned position. A ratio of the number of the journal bearing cooling holes 200 to the start-up holes 65 is 6:1. Each of the journal bearing cooling holes 200 has a diameter D5 of about 0.078 inches (0.198 cm). Accordingly, a total cooling area is about 0.00238 inches$^2$ (0.0153 cm$^2$).

Pressures in various cavities inside the ACM 10 of FIG. 1 impact thrust loading and start-up. Air flow is controlled by a combination of sizing relationships between multiple features of the ACM 10 and particularly of the air bearing shaft 121. In an embodiment, a ratio of the total cooling area to the total start-up area is between 2.17 and 4.06. A ratio of the diameter D5 of one of the journal bearing cooling holes 200 to the diameter D4 of one of the start-up holes 65 is between 1.21 and 1.66. A ratio of the outer diameter D1 of the first shaft body portion 74 to the diameter D5 of one of the journal bearing cooling holes 200 is between 10.78 and 12.40. A ratio of the outer diameter D1 of the first shaft body portion 74 to the diameter D4 of one of the start-up holes 65 is between 14.91 and 18.1. A ratio of the inner diameter D2 of the first shaft body portion 74 to the diameter of one of the journal bearing cooling holes 200 is between 8.43 and 9.73. A ratio of the inner diameter D2 of the first shaft body portion 74 to the diameter D4 of one of the start-up holes 65 is between 11.66 and 14.2.

A process for installing the air bearing shaft 121 in the ACM 10 is described herein in reference to FIGS. 1-5. The order of description of the process of installing the air bearing shaft 121 in the ACM 10 does not necessarily imply a particular required order of process steps. The air bearing shaft 121 is inserted into the journal bearing 42. The first shaft body portion 74 is positioned within the journal bearing 42 such that the start-up holes 65 are axially aligned with the cavity 66 formed between the journal bearing 42 and the face 53 of the seal disk 50. The journal bearing cooling holes 200 are axially aligned between the journal bearing 42 and the seal land 80 proximate the knife-edge seal 70 and the group of knife-edge seals 72. The air bearing shaft 121 is coupled to the thrust shaft 38 at the forward extending portion 54 and the surface 120. The air bearing shaft 121 is coupled to the turbine rotor 30 at the air bearing shaft end 68 and the turbine rotor end 82. The coupling may be performed by an interference fit.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An air bearing shaft, comprising:
   a seal disk; and
   a shaft body comprising a first shaft body portion extending from a face of the seal disk to a knife-edge seal, the first shaft body portion comprising:
      a plurality of journal bearing cooling holes positioned axially closer to the knife-edge seal than to the face of the seal disk, the journal bearing cooling holes extending through the first shaft body portion to a hollow interior, and the journal bearing cooling holes having a total cooling area; and
      a plurality of start-up holes positioned axially closer to the face of the seal disk than to the knife-edge seal, the start-up holes extending through the first shaft body portion to the hollow interior, the start-up holes having a total start-up area, and a ratio of the total cooling area to the total start-up area is between 2.17 and 4.06.

2. The air bearing shaft according to claim 1, wherein the journal bearing cooling holes are substantially equally distributed at a substantially axially aligned first position, the start-up holes are substantially equally distributed at a substantially axially aligned second position, and a ratio of a number of the journal bearing cooling holes to the start-up holes is 6:1.

3. The air bearing shaft according to claim 1, wherein a ratio of a diameter of one of the journal bearing cooling holes to a diameter of one of the start-up holes is between 1.21 and 1.66.

4. The air bearing shaft according to claim 1, wherein a ratio of an outer diameter of the first shaft body portion to a diameter of one of the journal bearing cooling holes is between 10.78 and 12.40.

5. The air bearing shaft according to claim 1, wherein a ratio of an outer diameter of the first shaft body portion to a diameter of one of the start-up holes is between 14.91 and 18.1.

6. The air bearing shaft according to claim 1, wherein a ratio of an inner diameter of the first shaft body portion to a diameter of one of the journal bearing cooling holes is between 8.43 and 9.73.

7. The air bearing shaft according to claim 1, wherein a ratio of an inner diameter of the first shaft body portion to a diameter of one of the start-up holes is between 11.66 and 14.2.

8. The air bearing shaft according to claim 1, further comprising a second shaft body portion proximate the knife-edge seal of the first shaft body portion and extending to an air bearing shaft end, wherein the journal bearing cooling holes are axially positioned about 0.745 inches (1.892 cm) from an end plane of the air bearing shaft end and the start-up holes are axially positioned between about 1.84 inches (4.67 cm) and 2.535 inches (6.439 cm) from the end plane of the air bearing shaft end.

9. An air cycle machine assembly comprising:
   a journal bearing; and
   an air bearing shaft comprising a seal disk and a shaft body, the shaft body comprising a first shaft body portion positioned within the journal bearing, the first shaft body portion extending from a face of the seal disk to a knife-edge seal, the first shaft body portion comprising:
      a plurality of journal bearing cooling holes positioned axially closer to the knife-edge seal than to the face of the seal disk, the journal bearing cooling holes extending through the first shaft body portion to a hollow interior, and the journal bearing cooling holes having a total cooling area; and
      a plurality of start-up holes positioned axially closer to the face of the seal disk than to the knife-edge seal, the start-up holes extending through the first shaft body portion to the hollow interior, the start-up holes having a total start-up area, and a ratio of the total cooling area to the total start-up area is between 2.17 and 4.06.

10. The air cycle machine assembly according to claim 9, wherein the journal bearing cooling holes are substantially equally distributed at a substantially axially aligned first position, the start-up holes are substantially equally distributed at a substantially axially aligned second position, and a ratio of a number of the journal bearing cooling holes to the start-up holes is 6:1.

11. The air cycle machine assembly according to claim 9, wherein a ratio of a diameter of one of the journal bearing cooling holes to a diameter of one of the start-up holes is between 1.21 and 1.66.

12. The air cycle machine assembly according to claim 9, wherein a ratio of an outer diameter of the first shaft body portion to a diameter of one of the journal bearing cooling holes is between 10.78 and 12.40.

13. The air cycle machine assembly according to claim 9, wherein a ratio of an outer diameter of the first shaft body portion to a diameter of one of the start-up holes is between 14.91 and 18.1.

14. The air cycle machine assembly according to claim 9, wherein a ratio of an inner diameter of the first shaft body portion to a diameter of one of the journal bearing cooling holes is between 8.43 and 9.73.

15. The air cycle machine assembly according to claim 9, wherein a ratio of an inner diameter of the first shaft body portion to a diameter of one of the start-up holes is between 11.66 and 14.2.

16. The air cycle machine assembly according to claim 9, further comprising a second shaft body portion proximate the knife-edge seal of the first shaft body portion and extending to an air bearing shaft end, wherein the journal bearing cooling holes are axially positioned about 0.745 inches (1.892 cm) from an end plane of the air bearing shaft end and the start-up holes are axially positioned between about 1.84 inches (4.674 cm) and 2.535 inches (6.439 cm) from the end plane of the air bearing shaft end.

17. The air cycle machine assembly according to claim 9, wherein the start-up holes are axially positioned to align with a cavity formed between the journal bearing and the face of the seal disk.

18. A method of installing an air bearing shaft in an air cycle machine assembly, comprising:
   inserting the air bearing shaft into a journal bearing, the air bearing shaft comprising a seal disk and a shaft body, the shaft body comprising a first shaft body portion positioned within the journal bearing, the first shaft body portion extending from a face of the seal disk to a knife-edge seal, the first shaft body portion comprising:
  a plurality of journal bearing cooling holes positioned axially closer to the knife-edge seal than to the face of the seal disk, the journal bearing cooling holes extending through the first shaft body portion to a hollow interior, and the journal bearing cooling holes having a total cooling area; and
  a plurality of start-up holes positioned axially closer to the face of the seal disk than to the knife-edge seal, the start-up holes extending through the first shaft body portion to the hollow interior, the start-up holes having a total start-up area, and a ratio of the total cooling area to the total start-up area is between 2.17 and 4.06; and
coupling the air bearing shaft to a thrust shaft of the air cycle machine assembly; and
coupling the air bearing shaft to a turbine rotor of the air cycle machine assembly.

19. The method according to claim 18, further comprising:
aligning the journal bearing cooling holes axially between the journal bearing and a seal land proximate the knife-edge seal.

20. The method according to claim 18, further comprising:
aligning the start-up holes axially with a cavity formed between the journal bearing and the face of the seal disk.

* * * * *